(12) United States Patent
Keller et al.

(10) Patent No.: US 10,492,086 B2
(45) Date of Patent: Nov. 26, 2019

(54) METHOD AND DEVICE FOR OPTIMISING THE COEXISTENCE OF RADIO PICO-NETWORKS

(71) Applicant: AVANTIX, Aix En Provence (FR)

(72) Inventors: Christophe Keller, Marseilles (FR); Lucas Valverde, La Valette (FR)

(73) Assignee: AVANTIX, Aix en Provence (FR)

( * ) Notice: Subject to any disclaimer, the term of this patent is extended or adjusted under 35 U.S.C. 154(b) by 0 days.

(21) Appl. No.: 15/846,314

(22) Filed: Dec. 19, 2017

(65) Prior Publication Data
US 2018/0192304 A1 Jul. 5, 2018

(30) Foreign Application Priority Data
Dec. 29, 2016 (FR) ..................... 16 63519

(51) Int. Cl.
*H04W 24/02* (2009.01)
*H04W 24/08* (2009.01)
(Continued)

(52) U.S. Cl.
CPC ........... *H04W 24/02* (2013.01); *H04W 16/14* (2013.01); *H04W 24/08* (2013.01);
(Continued)

(58) Field of Classification Search
CPC ..... H04W 16/14; H04W 24/02; H04W 24/08; H04W 28/16; H04W 28/22; H04W 72/04; H04W 72/0446; H04W 72/08; H04W 72/085; H04W 72/10; H04W 84/20; H04W 16/02; H04W 16/04; H04W 16/10; H04W 16/12; H04W 24/00; H04W 28/00; H04W 28/02; H04W 28/06; H04W 28/10; H04W 72/00; H04W 72/02; H04B 1/713
See application file for complete search history.

(56) References Cited

U.S. PATENT DOCUMENTS 6,298,376 B1 10/2001 Rosner et al.
6,816,507 B1 * 11/2004 Jarbot ................... H04L 1/0025
370/465
(Continued)

FOREIGN PATENT DOCUMENTS

FR 2760582 9/1998
WO 02/13429 2/2002

*Primary Examiner* — Tri H Phan
(74) *Attorney, Agent, or Firm* — Hauptman Ham, LLP

(57) ABSTRACT

The present relates to a method for optimising the coexistence of radio "pico-networks" (P), each "pico-network" (P) comprising at least one modem (E1, E2, E3) connected to a central node (N) comprising at least one memory to store data and/or computer programs and at least one processor, said method comprising at least one step to allocate communication channels by the central node (N), for each of the modems by means of an allocation to algorithm, to allow the coexistence between said "pico-networks" (P), said method being characterized in that step to allocate communication channels comprises at least: determination of the direction of communication and associated bit rate; and optimisation, by means of an optimisation algorithm, of the transmission rate of the messages and/or data on the communication channels as a function of the direction of the communication.

24 Claims, 1 Drawing Sheet

Figure 1:
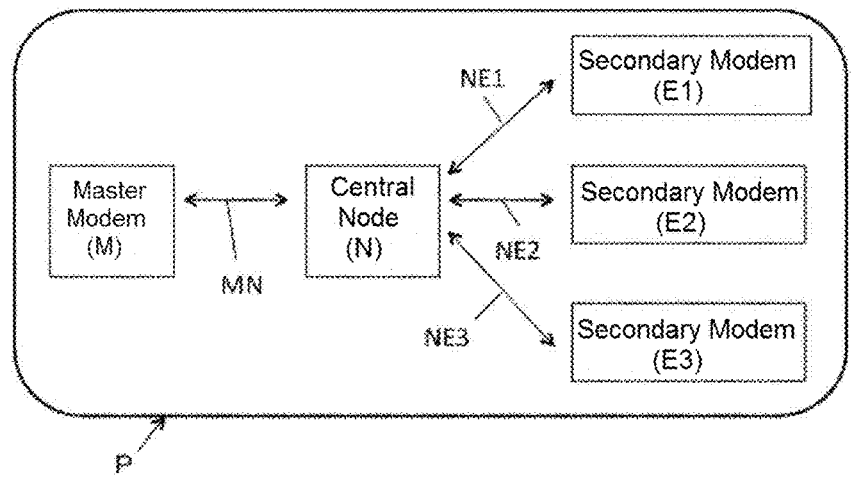

(51) Int. Cl.
*H04W 72/08* (2009.01)
*H04W 16/14* (2009.01)
H04W 72/04 (2009.01)
H04W 84/20 (2009.01)

(52) U.S. Cl.
CPC ...... *H04W 72/085* (2013.01); *H04W 72/0446* (2013.01); *H04W 84/20* (2013.01)

(56) References Cited

U.S. PATENT DOCUMENTS

| | | | |
|---|---|---|---|
| 8,310,995 B2* | 11/2012 | Murai | H04W 72/085 370/328 |
| 8,929,259 B2* | 1/2015 | Banerjee | H04W 16/14 370/278 |
| 9,986,580 B2* | 5/2018 | Leung | G06Q 10/00 |
| 2013/0034040 A1* | 2/2013 | Priotti | H04B 7/0417 370/312 |
| 2015/0245358 A1* | 8/2015 | Schmidt | H04L 43/0888 370/329 |
| 2017/0265100 A1* | 9/2017 | Ryu | H04W 76/10 |

* cited by examiner

METHOD AND DEVICE FOR OPTIMISING THE COEXISTENCE OF RADIO PICO-NETWORKS

TECHNICAL FIELD OF THE INVENTION

The present invention relates to the field of telecommunications, in particular to a device and method allowing the coexistence of radio "pico-networks" of several telecommunication groups.

TECHNOLOGICAL BACKGROUND OF THE INVENTION

A problem in the field of radiocommunications concerns the optimal, radio coexistence of several groups of telecommunications. Indeed, within a radiocommunication system having a predetermined frequency band, the data shared between several modems connected to a network can easily be intercepted and diverted.

Document US20140185574 describes a method for radio coexistence between two devices of personal mobile radio technology or PMR, one of which is a narrowband device and the other a broadband device, each device respectively interacting via radio link with base stations connected to a control unit of the radio resource of their respective network. The method comprises a step to detect the presence of a narrowband radio transmitting device in the proximity of the broadband device; a step to transmit a message over the broadband network, addressed to its control unit, said message indicating the presence of a potential narrowband transmitter in the proximity of said broadband device; and a step, by the control unit associated with the broadband network, to allocate new frequency blocks for uplinks only within predefined assigned periods. This method only allows a reduction in interferences or perturbations experienced by the narrowband device on its receiving channel due to the proximity of the broadband device. However, the radio coexistence method and system in this document do not allow the optimal coexistence of "pico-networks", in particular because they do not take into account the quality of communication of each connection for each radio modem, and do not allow the allocation of transmission slots as a function of the priority nature of messages.

Document EP2543220 describes a method for allocating radio resources to an application from among shared radio blocks in a predetermined frequency band during a periodic radio frame between base stations, each radio block being spread over frequencies of said band during a time slot of the radio frame and able to be associated with a communication link between a base station and a mobile station. The method comprises—in response to parameters of service quality required by the application—in a base station: an estimation of the occupancy rate of the radio blocks during consecutive radio frames, and allocation to the application of at least one radio block having an occupancy rate lower than a threshold and having periodicity expressed in frame periods dependent on required service quality parameters. The service quality parameters, as is conventional, can be a maximum allocation time and required bit rate to transmit data on an uplink or downlink, or other equivalent parameters. However, the allocation method and system in this document first do not allow reliable management of the multiplexing of links between modems, and secondly a managed, guaranteed bandwidth according to the priority nature of the data packets to be sent.

GENERAL DESCRIPTION OF THE INVENTION

It is the objective of the present invention to overcome some of the disadvantages of the prior art by proposing a method for optimising the coexistence of radio "pico-networks".

This objective is reached with a method for optimising the coexistence of radio "pico-networks", each "pico-network" comprising at least two modems interconnected via a central node comprising at least one memory to store data and/or computer programs and at least one processor, said method comprising at least one step to allocate communication channels by the central node, for each of the modems by means of an allocation algorithm, to allow coexistence between said "pico-networks", said method being characterized in that the step to allocate communication channels comprises at least:

determination of the direction of communication and associated bit rate;
  optimisation, by means of an optimisation algorithm, of the transmission rate of the messages and/or data on the communication channels as a function of the direction of the communication.

According to another particularity of the invention, the step to allocate communication channels inter alia comprises dynamic evaluation, by means of an evaluation algorithm, taking into account the quality of a communication, per frame, for each communication channel and for the direction of said communication.

According to another particularity of the invention, the allocation step also comprises taking into account the management of the priority levels of the transmitted data.

According to another particularity of the invention, the determination of communication channels takes place according to pseudo-random sequences from two tables.

According to another particularity of the invention, the pseudo-random sequences are defined at least as a function of:

the frequency bands for which the modems are configured;
  a security key particular to the application for which said modems are configured.

According to another particularity of the invention, the communication channels comprise at least one physical channel.

According to another particularity of the invention, the physical channels are allocated for fixed time slots grouped together per frame.

According to another particularity of the invention, the physical channels are determined for fixed time slots grouped together per frame by means of a frequency—hopping spread spectrum algorithm.

According to another particularity of the invention, the communication channels also comprise logical communication channels that are multiplexed per frame by means of a time-division multiplexing algorithm.

According to another particularity of the invention, the logical communication channels are mapped on physical communication channels by means of a mapping algorithm at least for data transmission between the modems of one same group forming a pico-network, signalling and controlling a group of modems, and pairing via authentication and exchange of keys between modems.

According to another particularity of the invention, optimisation of the bit rate of at least one logical data transmission channel is specific to each group of modems.

According to another particularity of the invention, the quality of communication of each modem for each link during a frame, is evaluated dynamically as a function of the acknowledgements of received signal packets and measurement of the powers of said signals.

According to another particularity of the invention, the physical channels of the frames are evenly distributed between the different logical channels and different directions of communication.

According to another particularity of the invention, when a message has priority the logical channels are no longer multiplexed, the frame being fully allocated to said message; if several messages have priority and are present at the same time, the logical channels are then multiplexed and the frame is allocated to the different messages.

The objective of the present is to overcome some disadvantages of the prior art by proposing a device for optimising the coexistence of radio "pico-networks".

This objective is reached with a device for optimising the coexistence of radio "pico-networks" (P) formed in a star-shaped architecture, each "pico-network" comprising several modems with star interconnection, including a central node comprising at least one memory to store data and/or computer programs, connected first to a master modem and secondly to the other modems, said device being characterized in that the central node also comprises a processor receiving a timestamp sent by the master modem to the central node and to the other modems to clock the "pico-network", and the computer program containing a code executable by the processor to allow the allocation of physical communication channels to the different modems of the "pico-network" by the node, by optimising the coexistence of the modems in the "pico-network".

According to another particularity of the invention, the allocation of channels takes place pseudo-randomly via the selection, for each "pico-network", of the channel frequencies assigned to a group of modems forming each "pico-network".

According to another particularity of the invention, the central node allows management of the multiplexing of logical communication channels and priority of data.

According to another particularity of the invention, the central node also allows controlled optimisation of the bit rate of the logical communication channels between the modems.

According to another particularity of the invention, the central node allows determination and adjustment of the quality of transmission for each logical communication channel, needed for coexistence of said "pico-networks", as a function of the power and/or bit rate of the radio signals.

According to another particularity of the invention, the central node (N) central allows the dynamic allocation of a frame as a function of:
  the needs and priority of data on a logical communication channel;
  the quality of the logical channel coupled with a dynamic optimisation of the bit rate of the radio signal transmitting said data.

According to another particularity of the invention, the central node is a modem.

According to another particularity of the invention, the master modem is capable of synchronizing the physical communication channels by providing timestamps.

According to another particularity of the invention, the device allows the allocation of physical channels to each modem of a plurality of "pico-networks", the number of which corresponds to the number of time slots of the frame.

DESCRIPTION OF THE ILLUSTRATIVE FIGURES

Figure 2:
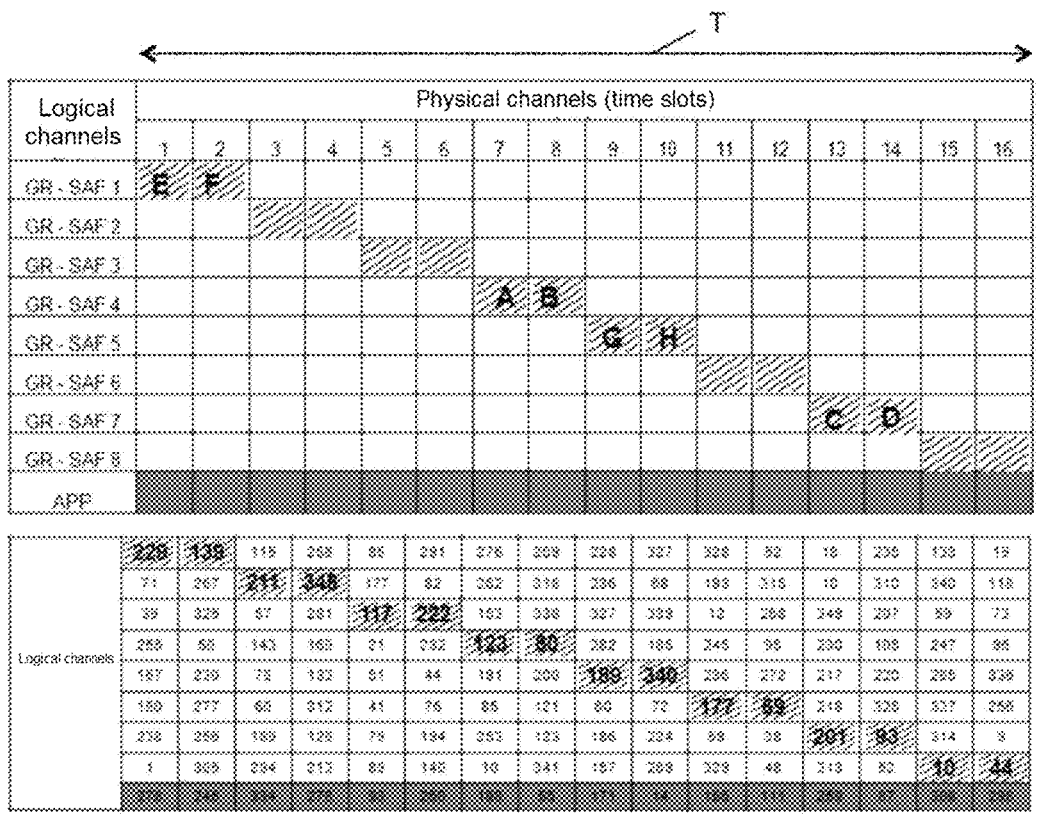

Other particularities and advantages of the present invention will become better apparent on reading the following description given with reference to the appended drawings in which:

FIG. 1 schematically illustrates a star architecture of the different modems coexisting in a "pico-network", according to one embodiment of the invention;

FIG. 2 illustrates one functioning mode of the matrix of "pseudo-random" frequencies of a frame to allocate the communication channels of a "pico-network", according to one embodiment of the invention.

DESCRIPTION OF PREFERRED EMBODIMENTS OF THE INVENTION

The present invention relates to a method for optimising the coexistence of radio "pico-networks" (P) of several telecommunication groups. It will be noted that the term "pico-network" is used to describe restricted telecommunication groups that are defined as the connecting together of at least two modems. Therefore, each "pico-network" comprises at least two secondary modems (E1, E2, E3) interconnected via a central node (N) comprising at least one memory to store data and/or computer programs, and at least one processor. In some embodiments, a restricted telecommunication group can be limited to a maximum of five participants. As illustrated in FIG. 1 for example, a telecommunication group is composed of a central node (N) connected to a master modem (M) and to no more than three secondary modems (E1, E2, E3) called terminal points (E1, E2, E3). The master modem (M) is connected via a link (MN) with the central modem (N); and the three terminal points (E1, E2, E3) are connected via links (NE1, NE2, NE3) to the central node (N) in a star architecture. The method comprises at least one step to allocate communication channels for each of the modems (M, N, E1, E2, E3) of a pico-network by means of an allocation algorithm executed on a central system to ensure coexistence between said "pico-networks". The allocation of communication channels consists firstly of determining the direction of communication and associated bit rate, and secondly of using an optimisation algorithm to optimise the transmission rate of the messages and/or data on the communication channels as a function of the direction of communication.

In some embodiments, allocation also consists of dynamically evaluating the quality of a communication per frame (T), using an evaluation algorithm, for each communication channel and per direction of said communication. A frame allows the conveying of a data packet, during a time slot of the frame, between two modems via a physical medium. This step allows the automatic adjusting of transmitting power, and of the transmission rate of a message.

In some embodiments, the allocation step also comprises management of the priority levels of transmitted data. The data transmitted to during a communication can be of various types. For example, but not limited thereto, for an emergency call a priority channel can be allocated for faster transmission of instructions concerning the emergency call.

In some embodiments, the communication channels comprise at least one physical channel. By physical channel is meant a time slot of fixed size. Indeed, the modem or central node (N) for a group of pico-networks, or for a centralised monitoring system of pico-networks, uses a timestamp sent by the Master Node, this timestamp being used to clock the functioning of each pico-network, and the central node (N) allocates time slots or physical channels as well as frequencies or logical communication channels to the different modems (E) of a "pico-network".

In some embodiments, the physical channels are allocated for fixed time slots grouped together per frame.

In some embodiments, the physical channels are determined for fixed time slots grouped together per frame by means of a frequency-hopping spread spectrum algorithm.

In some embodiments, the communication channels also comprise logical communication channels that are multiplexed per frame by means of a time-division multiplexing algorithm.

Time-division multiplexing is a technique for data processing, via time mixing, having the objective of allowing the conveying on one same channel (called high-speed path HS) of a set of data originating from different low bit rate channels (called low-speed paths LS) when these must communicate simultaneously from one same starting point to one same arrival point. Multiplexing is said to be time divided insofar as the data corresponding to each path or channel are interleaved over time. This multiplexing inter alia allows the passing of synchronous or asynchronous flux over a synchronous link. The packets not necessarily arriving in order of transmission along the paths traveled. A demultiplexing algorithm is then used to replace said packets in order and to separate the flux of the different channels so as to restore data such as they were before the multiplexing process.

With multiplexing it is therefore possible to attenuate interferences or perturbations between the signals transmitted by different modems on different channels, whereas spectrum spreading by frequency hopping allows the providing of transmission having improved average quality. Indeed, the quality of a communication or radio link (measured by error rate) may vary with the frequency of the transmitted carrier or wave. Spectrum spreading, consisting of alternatively using several channels (sub-carriers) distributed over a frequency band in pseudo-rando sequence known to the transmitter and receiver, allows attenuation of variations in the quality of communication. Spectrum spreading therefore has advantages compared with the use of a single frequency which are the following: the transmitted signal is more resistant to interferences, the signal is more difficult to intercept, and the transmitted signals can share frequency bands with other types of transmission, thus allowing more efficient the use of bandwidth; the sharing of frequencies adds minimum noise to any type of transmission.

FIG. 2 illustrates a nonlimiting example of the communication channel allocation functionality in a "pico-network" (P), performed by the executable code.

Communication is therefore divided into frames composed of physical channels, preferably these physical channels are time slots of fixed size (e.g. 12.5 ms) grouped together in frames of 16 slots. Communication is divided into five frames per second, therefore each frame lasts a time of 0.20 second.

In some embodiments, the determination of the physical and logical channels takes place according to pseudo-random sequences from two tables recorded in the memory of at least one central node (N). Indeed, data communications use several channels determined as per a scheme determined by two tables of which at least one forms a pseudo-random matrix of frequencies. In a first table, the columns represent the physical channels or time slots, and the rows give the assigned pico-network among the managed groups of pico-networks. The first table defines the time slots allocated to communication of signalling between modems, for each group of modems of a pico-network.

The shaded and hatched boxes are the channels dedicated to signalling between modems of a group. The neutral boxes are channels dedicated to communication of the group. The grey-coloured boxes are physical channels able to be used a group of modems of a pico-network when pairing the different modems of a group.

The different logical channels in the first table are determined by a "pseudo-random" frequency matrix of a second table, enabling the different modems of a group to communicate together (signalling, pairing or data transmission) in accordance with the randomly selected frequencies in the boxes of the second table. Therefore, for modems E, F of the pico-network SAF1, the pairing frequencies are respectively those of the logical channels 278 and 245, whereas the frequencies for signalling will be those of logical channels 229 and 139, the frequencies of the other modems in the group will be randomly selected from among the channels indicated in the first two columns.

The signalling and pairing channels are first calculated. Next, the physical channels are calculated and unicity is guaranteed taking into account the preceding values and the signalling/pairing channels. When a modem signals itself in an allocation matrix, the program determines the shifting of the modem in slots (group number) as a function of the already signalled modems. The tables therefore allow the establishing of different communication frequencies generated randomly.

Slots No 3 to 16 can be distributed following configurations based on the same principle as for slots No 1 and 2.

In some embodiments, the pseudo-random sequences are defined at least as a function of:
  the frequency bands for which the modems are configured;
  a security key particular to the application for which said modems are configured.

These parameters for defining pseudo-random sequences are particular to each deployment of the modems of one group.

Therefore, a mapping algorithm can map each physical channel with the following different logical channels:
  signalling and control logical channels of one group of modems;
  logical channels intended for pairing, authentication and exchange of keys between the modems of a group;
  logical channels for data transmission or communication between modems of one same group.

These logical communication channels are mapped on the physical communication channels by means of a mapping algorithm formed by a code that can be executed by a processor to perform the above-defined functions.

In some embodiments, instead of matrix tables being used as basis, the signalling or pairing channels are computed from a conventional function generating "random" numbers and from a seed. The seed is any random value allowing a diversified result to be obtained depending on different parameters, such as the frequency bands and security key particular to the allocation algorithm for which the modems are configured.

In some embodiments, optimisation of the bit rate of at least one logical channel for data transmission is specific to each group of modems. This bit rate optimisation is also a component of the allocation of slots which is controlled by the central node (N) via its timestamp. Therefore, the central node (N) determines the quality of transmission for each of the links and makes adjustment thereof as a function of the power and/or effective radio bit rate. For this purpose, the algorithm for allocation and bit rate optimisation applies a specific protocol differing from the prior art by:

varying bit rate per unit of fixed time (slots);
combining analysis of input radio balance (acknowledgements and RSSI) with output variability of bit rate and transmitting power.

In some embodiments, the program comprises an evaluation function of the quality of communication of each modem for each link during a frame (T). This quality is evaluated and/or revaluated dynamically as a function of the acknowledgements of received signal packets and RSSI measurements (Received Signal Strength Indication which define the strength of the received signal) of said signals. Indeed, under nominal functioning, in one same frame, the bit rate of the logical data communication channels is generally identical, and this corresponds to the current functioning mode of links between different modems. In the present method, the number of acknowledgements determined during a period of time and the result of RSSI measurement are analysed to evaluate the quality of communication. Since a modem may have several connections, this measurement of functioning is available for each thereof independently of the others. The other logical channels (signalling, control, pairing) are generally in nominal mode.

In some embodiments, the physical channels of the frames (T) are evenly distributed between the different logical channels and the different directions of communication. For example, but not limited thereto, a communication comprising five frames of one second and for each modem and each link, there will be five evaluations during a frame.

In some embodiments, the program takes into consideration an indicator or flag indicating that a message has priority to interrupt multiplexing of the physical channels and follow a procedure according to the conditions below. In this hypothesis, the frame (T) is fully allocated to said message. If several messages have priority and are present at the same time, the physical channels are multiplexed and the allocated frame is distributed as a function of the recorded number of different messages signalled as having priority. Indeed, by default, all messages have the same level of priority. This means that the slots of the radio frames are evenly distributed between the different links and different directions of communication. When a message has priority, the links are no longer multiplexed so that the radio frame can be fully allocated to this priority message. Therefore, the present method allows guaranteed bandwidth for one or more priority messages.

In some embodiments, the method to optimise radio "pico-networks", for each group of radio modems, comprises an adjustment of power and transmission rate, a guaranteed bandwidth depending on the priority nature of the packets to be sent, whilst guaranteeing pseudo-random generation of encrypting keys. Therefore, the frame of a "pico-network" is allocated dynamically by the central modem (N) as a function of needs and of the priority of a link in respect of data, and as a function of link quality coupled with dynamic optimisation of the radio bit rate.

The present invention also relates to a device for optimising the coexistence of radio "pico-networks" (P) comprising a star-shaped architecture, each "pico-network" comprising several modems (M, N, E) with star interconnection, including a central node or modem (N) comprising at least one memory to store data and/or computer programs and a master modem (M). The central node (N) of the device also comprises a processor receiving a timestamp sent by the master modem (M) to the node (N) to clock the "pico-network" and, via an allocation program, to allow the allocation of the physical communication channels to the different modems of the "pico-network" (P) by the node (N), via the execution of the program on the processor, to optimise the coexistence of the modems in the "pico-network".

In some embodiments, the master modem (M) provides the timestamp to the other modems. It is the actual receiving of the timestamp which enables the other modems to synchronize themselves with accuracy over time (clock drift).

Indeed, the triggering of transmission of this timestamp is tuned to the PPS (Pulse Per Second) of the GPS (Ground Positioning System) that is only integrated by modem M.

This particularity enables the pico-networks (groups), outside radio range, to merge in the same radio environment (time multiplexing/matrix channel in FIG. 2) thereby limiting interferences.

In some embodiments, the device allows the allocation of physical channels to each modem of a plurality of "pico-networks" (P), the number of pico-networks corresponding to no more than the number of slots or physical channels. As illustrated for example in FIG. 1, the master modem (M) transmits a timestamp so that the central node (N) and the secondary modems (E1, E2, E3) bring themselves into line with the clock of the master modem.

In some embodiments, the central node—as a function of the clock of the master modem and data priority levels between the different modems of a group of the "pico-network"—manages multiplexing of the links of logical communication channels.

In some embodiments, the central node also allows controlling of the optimisation of bit rates of logical communication channels between modems.

In some embodiments, the central node allows the determining and adjustment of transmission quality for each logical communication channel, needed for coexistence of said "pico-networks", as a function of the power and/or bit rate of the radio signals.

In some embodiments, the central node (N) allows the dynamic allocation of a frame (T) as a function of:
the needs and priority of data on a logical communication channel;
the quality of the logical channel as evaluated and determined by a dynamic optimisation of the bit rate of the radio signal transmitting said data.

In some embodiments, the allocation of channels takes place pseudo-randomly via the selection, for each "pico-network", of channel frequencies assigned to a group of modems forming the "pico-network". The "pseudo-random" frequencies are determined from two tables as illustrated for example in FIG. 2 but not limited thereto.

The present application describes various technical characteristics and advantages with reference to the Figures and/or to various embodiments. Persons skilled in the art will understand that the technical characteristics of one embodiment can be combined with characteristics of another embodiment, unless otherwise explicitly mentioned or unless it is obvious that these characteristics are incompatible or the combination does not provide a solution to at least one of the technical problems mentioned in the present application. In addition, the technical characteristics described in a given embodiment can be isolated from the other characteristics of this embodiment unless otherwise explicitly mentioned.

It will be obvious for a skilled person that the present invention allows embodiments in numerous other specific forms without departing from the scope of application of the invention as claimed. As a result, the embodiments herein are to be construed as illustrations that can however be modified in the field defined by the scope of the appended claims, and the invention is not to be considered limited to the details given above.

The invention claimed is:

1. A method for optimising the coexistence of radio "pico-networks" (P), each "pico-network" (P) comprising at least two modems interconnected via a central node (N) comprising at least one memory to store data and/or computer programs and at least one processor, said method comprising at least one step to allocate communication channels by the central node, for each of the modems by an allocation algorithm, to allow coexistence between said "pico-networks" (P), said method wherein the step to allocate communication channels is executed by a computer program containing code executable by the processor to allow the allocation of physical communication channels to the different modems of the "pico-network" by the node, by optimizing the coexistence of the modems in the "pico-network" and comprises at least:
determining the direction of communication and associated bit rate; and
optimizing, by an optimisation algorithm, of the transmission rate of the messages and/or data on the communication channels as a function of the determined direction of the communication.

2. The method according to claim 1, wherein the step to allocate communication channels inter alia comprises dynamic evaluation, by an evaluation algorithm, taking into account the quality of a communication, per frame, for each communication channel and for the direction of said communication.

3. The method according to claim 2, wherein the quality of communication of each modem (M, N, E1, E2, E3) for each link during a frame, is evaluated dynamically as a function of the acknowledgements of received signal packets and measurement of the powers of said signals.

4. The method according to claim 1, wherein the allocation step also comprises taking into account the management of the priority levels of the transmitted data.

5. The method according to claim 1, wherein the determination of communication channels takes place according to pseudo-random sequences from two tables or from a performed computation.

6. The method according to claim 5, wherein the pseudo-random sequences are defined at least as a function of:
frequency bands for which the modems are configured; or
a security key particular to the application for which said modems are configured.

7. The method according to claim 1, wherein the communication channels comprise at least one physical channel.

8. The method according to claim 7, wherein the physical channels are determined for fixed time slots grouped together per frame by a frequency-hopping spread spectrum algorithm.

9. The method according to claim 7, wherein the communication channels comprise logical communication channels that are multiplexed per frame by a time-division multiplexing algorithm.

10. The method according to claim 9, wherein optimisation of the bit rate of at least one logical data transmission channel is specific to each group of modems.

11. The method according to claim 9, wherein when a message has priority the logical channels are no longer multiplexed, the frame being fully allocated to said message, if several messages have priority and are present at the same time, the logical channels are then multiplexed and the frame is allocated to the different messages.

12. The method according to claim 7, wherein the physical channels of the frames are evenly distributed between the different logical channels and different directions of communication.

13. The method according to claim 1, wherein the physical channels are allocated for fixed time slots grouped together per frame.

14. The method according to claim 1, wherein the logical communication channels are mapped on physical communication channels by a mapping algorithm at least for data transmission between the modems of one same group forming a pico-network, signalling and controlling a group of modems, and pairing via authentication and exchange of keys between modems.

15. Device for optimising the coexistence of radio "pico-networks" (P) formed in a star-shaped architecture, each "pico-network" comprising several modems with star interconnection, including a central node (N) comprising at least one memory to store data and/or computer programs, and a master modem (M), said device wherein the central node (N) also comprises a processor and receives a timestamp sent by the master modem (M) to the node to clock the "pico-network" (P) and the central node, allowing the allocation of physical communication channels to the different modems (M, E1, E2, E3) of the "pico-network" (P) by the node (N), via the execution of said programs on the processor, to optimise the coexistence of the modems in the "pico-network".

16. The device according to claim 15, wherein the allocation of channels takes place pseudo-randomly via the selection, for each "pico-network" (P), of the channel frequencies assigned to a group of modems forming each "pico-network" (P).

17. The device according to claim 15, wherein the central node (N) allows management of the multiplexing of logical communication channels and priority of data.

18. The device according to claim 15, wherein the central node (N) also allows controlled optimisation of the bit rate of the logical communication channels between the modems.

19. The device according to claim 15, wherein the central node (N) allows the determining and adjustment of transmission quality for each logical communication channel, needed for coexistence of said "pico-networks", as a function of a power and/or bit rate of the radio signals.

20. The device according to claim 15, wherein the central node (N) allows the dynamic allocation of a frame as a function of:
needs and priority of data on a logical communication channel;
a quality of the logical channel coupled with a dynamic optimisation of the bit rate of the radio signal transmitting said data.

21. The device according to claim 15, wherein the central node (N) is a modem.

22. The device according to claim 15, wherein the master modem (M) is configured to synchronize the physical communication channels by providing the timestamp.

23. The device according to claim 15, wherein the device allows the allocation of physical channels to each modem of a plurality of "pico-networks" (P), the number of which corresponds to the number of time slots of the frame.

24. The device according to claim 15, said allocation consisting at least of determining the direction of communication and associated bit rate, and of using an optimisation algorithm to optimise the transmission rate of the messages and/or data on the communication channels as a function of the direction of communication.

\* \* \* \* \*